United States Patent
Brandhorst, Jr. et al.

[19]
[11] Patent Number: 6,072,116
[45] Date of Patent: Jun. 6, 2000

[54] THERMOPHOTOVOLTAIC CONVERSION USING SELECTIVE INFRARED LINE EMITTERS AND LARGE BAND GAP PHOTOVOLTAIC DEVICES

[75] Inventors: Henry W. Brandhorst, Jr.; Zheng Chen, both of Auburn, Ala.

[73] Assignee: Auburn University, Auburn, Ala.

[21] Appl. No.: 09/167,619

[22] Filed: Oct. 6, 1998

[51] Int. Cl.$^7$ ................................................. H01L 31/101
[52] U.S. Cl. ........................ 136/253; 136/260; 136/261; 136/262; 136/264
[58] Field of Search .................. 136/253, 260, 136/261, 262, 264

[56] References Cited

U.S. PATENT DOCUMENTS

| | | | |
|---|---|---|---|
| 4,419,532 | 12/1983 | Severns | 136/253 |
| 4,906,178 | 3/1990 | Goldstein et al. | 431/79 |
| 5,057,162 | 10/1991 | Nelson | 136/253 |
| 5,447,786 | 9/1995 | Rose et al. | 428/229 |
| 5,503,685 | 4/1996 | Goldstein | 136/253 |
| 5,780,370 | 7/1998 | Chen et al. | 442/414 |
| 5,837,011 | 11/1998 | Wong | 8/181 |

OTHER PUBLICATIONS

"Reinforced Solid Erbium Oxide Emitters for TPV Applications," Z. Chen and coworkers, Proceedings of International Mechanical Engineering, Atlanta, Georgia, 1996.

*Primary Examiner*—Bernard Codd
*Attorney, Agent, or Firm*—Eugene I. Snyder

[57] ABSTRACT

Efficient thermophotovoltaic conversion can be performed using photovoltaic devices with a band gap in the 0.75–1.4 electron volt range, and selective infrared emitters chosen from among the rare earth oxides which are thermally stimulated to emit infrared radiation whose energy very largely corresponds to the aforementioned band gap. It is possible to use thermovoltaic devices operating at relatively high temperatures, up to about 300° C., without seriously impairing the efficiency of energy conversion.

8 Claims, 1 Drawing Sheet

THERMOPHOTOVOLTAIC CONVERSION USING SELECTIVE INFRARED LINE EMITTERS AND LARGE BAND GAP PHOTOVOLTAIC DEVICES

BACKGROUND OF THE INVENTION

The problem which our invention addresses is the efficient conversion of thermal energy to electrical energy. Thermophotovoltaic systems for conversion of thermal to electrical energy are well known. These are characterized by moderately inefficient conversion of thermal energy to light energy under optimal conditions, a low band gap photovoltaic device to convert the broadest range of light energy, and a need for cooling the photovoltaic device to prevent the low efficiency conversion of light to electrical energy from even further degradation resulting from a decrease in open circuit voltage associated with increasing temperatures. These characteristics, and the associated problems of prior art thermophotovoltaic (TPV) systems, are best illustrated by a brief examination of existing TPV systems.

A typical power input, or incident radiation, to photovoltaic devices in TPV systems is broad band radiation composed of wavelengths generally in the 1–2 micron range, corresponding to energies in the 0.6 to 1.2 electron volts range. In order for the photovoltaic device to capture as much energy in the broad band radiation as is possible, the band gap must match the lower energies of the radiation, that is, devices with a band gap on the order of no more than about 0.6 electron volts are desirable. This band gap ensures that all energy in the light spectrum is captured, but photon capture is not equally productive for all photons. Thus, that portion of the incident radiation having an energy close to the band gap of the photovoltaic device will effectively promote valence electrons into the conduction band; this leads to very efficient conversion of photons to current carriers. However, light energy substantially in excess of the band gap will promote valence electrons to energy states above the conduction band. These electrons undergo vibrational and rotational decay until they, too, achieve the energy of the conduction band, when as current carriers the electrons can effect conversion to electrical energy in an external circuit. But note that such electrons have lost much energy via vibrational and rotational decay, an energy loss manifested as thermal energy captured by the photovoltaic device itself which leads to a substantial increase in the device's operating temperature. Thus it is clear that the efficiency of energy conversion by a TPV device inherently decreases with an increase in the amount of thermal energy produced by incident radiation with an energy substantially in excess of the band gap.

But both the band gap and the open circuit voltage of the photovoltaic device decrease with increasing temperature. A consequence of decreasing the band gap is that still more of the total incident radiation will be converted to thermal energy because more photons will have energy in excess of that needed to move a valence electron into the conduction band. A consequence of decreasing the open circuit voltage, $V_{oc}$, is a lower efficiency of power conversion. This arises because in general the fill factor for a photovoltaic device, i.e., the highest value of the product of current times voltage divided by the product $I_{sc}V_{oc}$, where $I_{sc}$ is the short circuit current, decreases as the open circuit voltage decreases. Thus, for photovoltaic devices with a band gap of 0.6 eV and a $V_{oc}$~0.4 volts there is a necessity to cool the photovoltaic device for the sake of maintaining power conversion efficiency.

Where TPV conversion is desired in space, the cooling of photovoltaic devices occurs only via radiation and requires rather large, bulky radiative fins, which in turn exacts weight and volume penalties on the space vehicle. When devices operate at higher temperatures, the size of the radiator drops dramatically following a $T^4$ power law. Thus, to recapitulate concisely, there is a cascade of undesirable effects arising from broad band radiation having photons with "excess" energy (energy greater than the band gap) which is converted, in large part, to thermal energy, lowering $V_{oc}$ and thereby decreasing the efficiency of power conversion.

Since many of the undesirable characteristics of present TPV systems arises from a broad radiation energy band impinging on the photovoltaic device, it follows that a narrow radiation energy band could confer important benefits. It also ought to be clear that a higher $V_{oc}$ when used in prior art TPV devices would maximize conversion efficiency of light to electrical energy. It also follows that if the energy spectrum of the radiation source would closely match the band gap of the photovoltaic device at operating temperatures, there would be minimal energy loss—and consequently maximal energy conversion efficiency—via vibrational and rotational decay from electronic states above the conduction band. Since photovoltaic devices can be made with band gaps over the wide range of 0.3–3 eV, the problem is "merely" one of converting broad band light radiation arising from thermal excitation into a narrow band energy spectrum matching the band gap of a photovoltaic device in the 0.3–3 electron volt range where the device has an open circuit voltage at least as high as the prior art devices. And since the efficiency of power conversion increases with increasing $V_{oc}$, it follows that photovoltaic devices with a band gap greater than 0.6 eV are the more desirable devices.

We have achieved this goal by using selective infrared emitters as a means of converting thermal radiation incident on the emitters into narrow band infrared radiation with a peak energy on the order of about 1.2 electron volts. Using photovoltaic devices with a band gap in the 0.75–1.4 eV range, virtually all of the photons from selective infrared emitters can be effectively used to place electrons just into the conduction band of the photovoltaic device. Furthermore, since our higher band gap devices have both a higher open circuit voltage and an inherently higher fill factor, higher conversion efficiencies of light to electrical energy are also achieved. We also shall demonstrate that the photovoltaic device can be operated at temperatures in the 100–300° C. range with additional benefits.

SUMMARY OF THE INVENTION

Our invention is a process for converting thermal energy to electrical energy with higher efficacy and at a generally higher open circuit voltage and fill factor than previously possible. An embodiment comprises thermally stimulating narrow band and selective emissions in the infrared region of the electromagnetic spectrum using rare earth oxides as selective infrared emitters, and conducting said infrared emissions onto a photovoltaic device having a band gap closely matched to the energy of the infrared emissions at operating conditions of the device. In a more specific embodiment the photovoltaic device band gap is from about 0.75 up to about 1.4 eV. In a still more specific embodiment the band gap is between about 1.0 and about 1.3 eV. In another specific embodiment the material of the photovoltaic device is indium phosphide where up to 10 atom percent of phosphorous is replaced by arsenic. In another embodiment the rare earth oxide emitter is ytterbium oxide.

DESCRIPTION OF THE INVENTION

Figure 1:
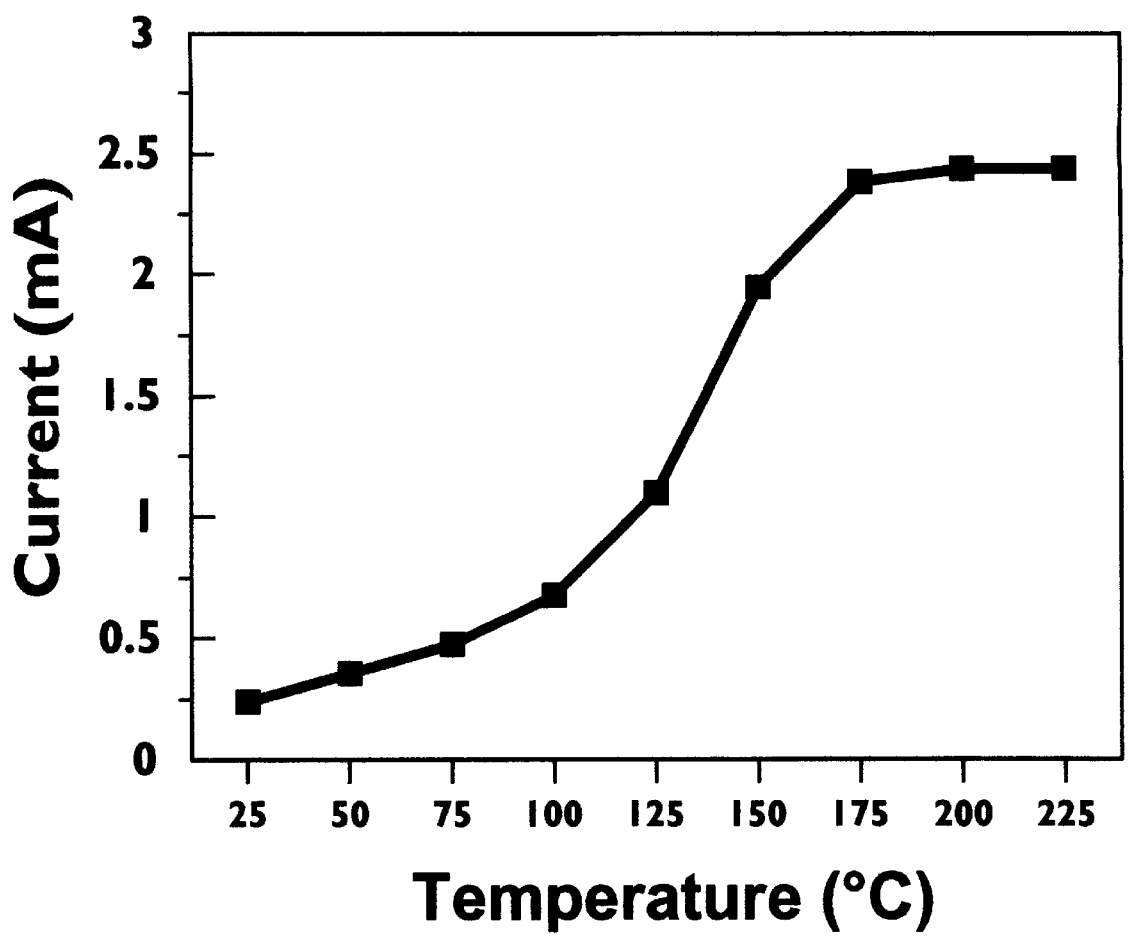
FIG. 1 is a graphical representation of the current change with temperature of a photovoltaic device irradiated with light of wavelength 0.98 microns.

Our invention rests on the integration of several disparate phenomena and their coupling to afford efficient thermophotovoltaic conversion. Our invention begins with the recognition that certain rare earth oxides have electronic structures such that at high temperatures the preponderance of thermal energy absorbed is emitted as a narrow band of radiation in the infrared spectrum. Our invention incorporates the realization that if the band gap of a photovoltaic device is closely matched to the energy of the selective infrared emission, there will be maximum conversion of photons to electrons in an external circuit, accompanied by minimal production of thermal energy in the photovoltaic device. Our invention is further based on the knowledge that a high band gap of the photovoltaic device is accompanied by a high open circuit voltage (with a higher fill factor than that of prior art devices) of the device, such that any decrease in $V_{oc}$ arising from an increase in device operating temperature affords a minimal decrease in power transfer efficiency. Other characteristics and nuances of our invention will be clear from the following exposition.

One essential element of our invention is a selective infrared line emitter. Selective infrared line emitters are devices which convert thermal energy to infrared radiation of narrow band width. Certain rare earth oxides are theoretically capable of emitting as much as 70% of the total incident thermal energy radiated at wavelengths between about 300 and 5000 nm at high temperature in a single spectral band whose peak wave length is dependent upon the electronic structure of the material. At short wavelengths, in the ultraviolet region of their spectrum, these rare earth oxides tend to have emissivity, but these modes are only excited efficiently at extremely high temperature. At the other end of the spectrum, in the far infrared, there is little power emitted even though there is high emissivity. Consequently, at temperatures on the order of a few thousand degrees the emissivity of these materials is effectively low except at a particular line frequency, or more correctly over a narrow band width centered at a particular line frequency characteristic of the rare earth oxide. As a result, the radiative characteristics of the rare earth oxides are narrow band emissions rather than a broad continuum superimposed upon a line spectrum. The use of rare earth oxides as selective line emitters in energy conversion has been recognized for some time. However, it is only with the methods of Rose and coworkers, U.S. Pat. Nos. 5,447,786 and 5,780,370, that physically robust selective infrared line emitters could be made.

The selective infrared line emitters used in the practice of our invention may be either of the fibrous type as described in the aforementioned patents of Rose et al. or, alternatively, may be tapecast as described by Chen et. al., *Proceedings of International Mechanical Engineering*, (Atlanta, Ga.), 1996. Although there is a preference to tapecast rare earth oxides since the concentration of rare earth oxide is substantially higher than in the fibrous material, we need to emphasize that our invention does not rest on the particular article of manufacture incorporating one or more rare earth oxides, but instead rests on a rare earth oxide, in whatever form, as a selective infrared line emitter.

Of the rare earth oxides, ytterbium, erbium, holmium, and neodymium are favored. Ytterbium is especially favored because it has an emission peaking at 0.96 micron, corresponding to 1.29 electron volts, in a reasonably narrow band width. That is, the width of the emission line at half-height is only 20% of the baseline width of the line emission. Ytterbium oxide also is favored since at 2745° C. there is a maximum theoretical efficiency of conversion of thermal energy into narrow band width photons of 1.29 electron volts approaching 70%. However, erbium oxide also is a preferred selective infrared line emitter used in the practice of our invention. Whichever rare earth oxide, or combination of rare earth oxides, is used, at least 90% of the selective infrared emissions which are conducted onto a photovoltaic device are within the band gap of the photovoltaic device (vide infra).

The choice of thermal source used to excite the selective line emitters in this invention is left to the artisan. Our invention is not dependent upon the thermal source used in any significant degree. Among the thermal sources which may be used are included sunlight focused by a concentrator to effect temperatures up to several thousand degrees in the selective line emitter. Radioisotopes also may be used to effect heating, as may fuel burning. But it needs to be emphasized that the source of thermal energy is a choice left to the worker and does not influence the success of our invention in any significant degree.

The second critical element in the practice of our invention is a photovoltaic device. Photovoltaic devices generally are all solid-state materials systems that are structured so as to convert light directly into electrical energy. These devices can be designed to optimize this energy conversion capability or they can be designed to optimize the obvious light detection capability. When photovoltaic structures are designed specifically to convert sunlight directly into electrical energy, they are termed solar cells. Even though the light emissions from selective infrared line emitters can be viewed as within the solar spectrum, we will use "photovoltaic device" as a more general descriptor rather than using the perfectly acceptable alternative of "solar cell."

Since light interacts with materials through photons, photovoltaic action is based on having materials that absorb photons. Photovoltaic devices produce voltage and current, hence the materials which absorb the photons must do so by creating charged particles that are capable of moving through the material and carrying a current. The class of materials that absorbs photons by producing free, charged particles is semiconductors.

In a semiconductor the ground state is actually a band of states that exist over a range of energies called the valence band. Even though the valence band defines a range of energy states, for simplicity and ease of understanding it is convenient to view the valence band as a single, discrete energy state. When the valence state electrons absorb photons they are elevated to an excited state. The excited state in a semiconductor is, like the valence band, generally not a single, discrete state but rather a range or band of states, but again for convenience we shall view it as a single state. Generally this excited state is referred to as the conduction band. The difference in energy between the highest valence state and the conduction band is called the band gap. When electrons are promoted from the valence band into the conduction band there are two associated phenomena; holes (positively charged structures) arise in the valence band, and negative charge (the electrons) arise in the conduction band. If charge-hole recombination is prevented and if an external circuit is placed between the conduction and valence bands, current will flow and conversion of light energy to electrical energy will have occurred. Photons with an energy equal to or greater than the band gap, $E_g$, can be absorbed by the photovoltaic device and can thus be converted to electrical energy. As previously indicated, the more closely is the photon energy matched to the band gap, the more efficient (in the sense of conversion of light to current carrying electrons) is photon absorption and the less is the excess in photon energy which is dissipated as (undesired) thermal energy.

For this invention we are most interested in photovoltaic devices with a band gap from about 0.75 to about 1.4 electron volt at the device operating temperature. A narrower band gap from about 1.0 to about 1.34 electron volt at the device's operating temperature, which corresponds to photons having a wave length between about 0.92 and 1.24 microns, is even more preferable in the practice of our invention.

Various types of photovoltaic structures are possible, commonly referred to as, e.g., p-n homojunction, p-i-n homojunction, etc., which are well known in the art and will not be expounded upon here. The particular type of photovoltaic structure which is used in the practice of our invention is not especially relevant and certainly is not critical, nor is it pertinent whether the material is single crystalline, polycrystalline, amorphous, or thin film. What is important is the band gap in the photovoltaic device, and within this limitation any structure within the aforementioned band gap range will suffice. Photovoltaic devices with a p-n junction often are structures of choice in the practice of our invention. However, photovoltaic structures with a Schottky barrier surface junction, which have metal-semiconductor surface barriers (M-S device) or a thin insulator layer inserted between the metal and the semiconductor (M-I-S device), also are fully applicable to the practice of our invention because their band gap can be varied rather conveniently. Such structures are represented by photovoltaic devices based on such semiconductors as InP, GaAs, CdTe, InAs, AlSb, GaSb, AlAs, GaP, as well as ternary and quaternary materials where, e.g., phosphorus has been partially replaced by As, gallium is partially replaced by Al, arsenic is partially replaced by N, and so forth. The particular semiconductor materials specified above are merely illustrative of those which may be used in the practice of our invention and are only representative rather than exhaustive of possible semiconductors. We emphasize again that what is critical is the band gap in the photovoltaic device, and that other characteristics are of only secondary importance, as, e.g., serving to increase the efficiency of energy conversion or to increase the radiation tolerance of the photovoltaic device.

It needs to be clearly stated, and equally clearly understood, that the band gap of the alloy in the photovoltaic device at the device's operating temperature is the central and critical issue, and that the particular alloy used is unimportant to the operability of our invention even though a particular alloy may be favored for other, incidental properties, such as radiation resistance. Nonetheless, it also is true that semiconductor materials from Group III–V of the periodic table have particularly favorable characteristics in photovoltaic devices used in the practice of our invention and thus are somewhat favored merely for pragmatic reasons. However, this does not exclude use of photovoltaic devices made from group II–VI, IV, ternary or quaternary combinations of materials.

It is well known that the band gap of photovoltaic devices is temperature dependent, decreasing as the operating temperature of the device increases. It also is inevitable that the absorbed photons will not be converted to current carrying electrons with 100% efficiency. Some of the photons will have excess energy which will be dissipated as thermal energy which is subsequently absorbed by the photovoltaic device itself causing its temperature to increase. Thus, the operating temperature of a photovoltaic device inevitably will be higher during periods of electric current generation than otherwise. What is most desirable in the practice of our invention is that the band gap of the photovoltaic device at operating conditions closely match the energy of the emissions from the selective line emitter, for it is under such conditions that most efficient energy conversion occurs. For the purpose of our invention, at least 90% of the total energy of the infrared emissions from the selective line emitter are within the band gap of the photovoltaic device.

Thermophotovoltaic systems previously have been criticized as energy sources, especially in space, for various reasons. One commonly voiced objection is that the large size of radiators needed to maintain the photovoltaic devices at sufficiently low operating temperatures led to weight and volume issues mitigating against the use of TPV systems aboard spacecraft. Because our invention both minimizes thermal effects and permits operation at elevated temperatures with high power conversion efficiency because of substantially higher open circuit voltages, our invention reduces radiator size drastically and largely removes this as an issue. Rough estimates predict that a fivefold reduction in size of the radiator fins ought to be possible, with like reduction in radiator fin mass. A second objection is that large radiation doses expected in space would cause substantial radiation damage to the photovoltaic devices, especially at the low operating temperatures commonly associated with photovoltaic devices having a band gap in the 0.3–0.7 electron volt range. In contrast, the higher band gap in our systems permits higher operating temperatures (without serious degradation of open circuit voltage). Operating temperatures of around 200° C. ensures that any radiation damage the device might encounter is fully annealed as it occurs. Furthermore, selection of known radiation-tolerant materials such as the InP system is particularly beneficial. Thus the radiation damage problem is resolved, and the spectrally matched emitter leads to high energy conversion efficiencies.

Many of the stated advantages of our invention may be illustrated by a photovoltaic device based on InP. The variation of InP band gap with temperature follows the relationship, $$E_g(T) = 1.344 - 5.1 \times 10^{-4}(T-300)$$

where $E_g(T)$ is the band gap at temperature T measured in degrees Kelvin. Thus, the band gap of the cell at 498° K. (225° C.) is 1.24 electron volts, which corresponds to light of 1.0 micron wavelength. Because InP is a direct band gap material, the absorption coefficient at the band edge is large ($\sim 10^5$). Finally, the open circuit voltage is about 0.4 volts at this temperature, which is equivalent to the room temperature voltage of low band gap (0.3–0.7 eV) photovoltaic devices like GaSb. It is clear that the high operating temperature reduces the size of the radiator for space use by a factor of at least five. A corollary benefit is that the operating temperature ensures that radiation damage is not an issue. In fact, InP is the most radiation insensitive of all the semiconductor materials for photovoltaic devices evaluated to date. H. B. Curtis and D. Marvin, "Final Results from the PASP Plus Flight Experiment," in Conference Record of the Twenty Fifth IEEE Photovoltaic Specialists Conference—1996, IEEE, New York, pp. 195–8 (1996). The temperature of these cells was on the order of 45° C. Other results show that InP cells anneal completely at 100° C. M. Yamaguchi and K. Ando, J. Appl. Phys., 54(11), 5555 (1988).

Of course, great variation in the materials used in the photovoltaic device is possible, especially within the Group III–V elements. This is illustrated by the InP system where phosphorus is replaced, in part, by arsenic, $InAs_{(1-x)}P_x$. Using 0.63 as the ratio of open circuit voltage to band gap, and a temperature dependence of the band gap in $InAs_{0.1}P_{0.9}$ as $$E_g(T)=1.2-4.9\times 10^4(T-300)$$

the photovoltaic device would be responsive to wavelengths from 1.0 to 1.09 microns at a temperature of only 150° C. Furthermore, the open circuit voltage of the cell is calculated to be around 0.4 volts at that temperature. Thus, the open circuit voltage compares quite favorably to lower band gap photovoltaic devices at this higher operating temperature, ensuring higher energy conversion. In addition, excellent photon capture with minimal dissipation via thermal degradation is expected and the fill factor at operating temperatures will be superior to that of materials with a lower band gap. In the practice of our invention operating temperatures may be in the range of from about 0 to about 300° C., with an operating temperature in the range of about 75 to about 225° C. preferred. In many situations an operating temperature of 150±50° C. will be optimal.

Another example of a ternary system with desirable properties is the aluminum gallium antimonide system, $Al_xGa_{(1-x)}Sb$, where x is from about 0.3 to about 0.5. That is, the ternary system contains 30–50 atom percent aluminum relative to the total of aluminum and gallium. Other examples of ternary systems with may be used in the practice of our invention include aluminum indium arsenide, gallium indium arsenide, germanium indium phosphide, and germanium indium arsenide.

Our discussion has focussed on selective infrared fine emitters as the source of radiation within a relatively narrow energy spectrum corresponding to a band gap of 0.75–1.4 eV. However, it is clear that the source of such radiation is not particularly relevant. We believe that the use of selective infrared line emitters, and particularly the rare earth oxides as the emission source, has special value. But we also need to emphasize that the source of the requisite radiation is not material to the success of our invention. Thus, one may use a filter to either reflect or transmit narrow band radiation of requisite energy from a radiation source with a much broader energy spectrum. Many variations will be apparent to those skilled in the art to produce the requisite narrow band radiation with an energy corresponding to the band gap which is a limitation of our invention, and all such variations are intended to be subsumed within the ambit of our invention.

EXAMPLE

Response of an Indium Phosphide Photovoltaic Cell to 1 micron Radiation. A simulated emitter was employed using a tungsten light source and a selective cutoff filter having peak wavelength transmission (62.7%) at 0.976 micron, a transmission envelope centered at 0.996 micron, and a bandwidth of 0.07 micron (i.e., bandwidth at half peak transmission). Light passing through the filter was passed to the surface of an indium phosphide photovoltaic cell whose temperature was varied between 0 and 250° C. The current in the cell and the open circuit voltage was measure at 25° intervals, with results presented in Table 1 and plotted as FIG. 1. The data clearly show the step increase in current, indicating conversion of light to electrical energy, in the 100–175° C. range, which corresponds to the temperature where the band gap of the photovoltaic device matches the energy of the incident radiation. Similar results were obtained for an emitter based on ytterbium oxide.

TABLE 1

Current produced at various temperatures.

| Temperature (° C.) | Current (mA) |
| --- | --- |
| 25 | 0.24 |
| 50 | 0.355 |
| 75 | 0.473 |
| 100 | 0.675 |
| 125 | 1.095 |
| 150 | 1.940 |
| 175 | 2.38 |
| 200 | 2.430 |
| 225 | 2.430 |

What is claimed is:

1. A process for efficient thermophotovoltaic conversion comprising thermally stimulating emissions from a selective infrared emitter of a rare earth oxide or mixtures thereof to afford selective infrared emissions with a narrow bandwidth, and conducting said selective infrared emissions onto a photovoltaic device operating at a temperature between about 75 and about 225° C. with a band gap from about 0.75 to about 1.4 electron volts at the device's operating temperature, where at least 90 percent of the total energy of said selective infrared emissions are within the band gap of said photovoltaic device.

2. The process of claim 1 where the band gap of the photovoltaic device is between about 1.0 and 1.34 electron volts.

3. The process of claim 1 where the photovoltaic device is comprised of semiconductor materials selected from the group consisting of indium phosphide, indium phosphide doped with as much as 10 atom percent arsenic replacing phosphorus, gallium antimonide, gallium antimonide doped with from 30 to about 50 atom percent aluminum replacing gallium, gallium arsenide, cadmium telluride, indium arsenide, aluminum arsenide, gallium phosphide, aluminum indium arsenide, gallium indium arsenide, germanium indium phosphide, and germanium indium arsenide.

4. The process of claim 1 where the selective infrared emitter is ytterbium oxide, erbium oxide, holmium oxide, or neodymium oxide or mixtures thereof.

5. The process of claim 4 where the selective infrared emitter is ytterbium oxide.

6. The process of claim 4 where the selective infrared emitter is erbium oxide.

7. The process of claim 1 where the operating temperature is between about 100 and about 200° C.

8. A process for efficient thermophotovoltaic conversion comprising conducting radiation having at least 90% of its energy in the range of 0.75 to about 1.4 electron volts onto a photovoltaic device operating at a temperature between about 75 and about 225° C. and with a band gap from about 0.75 to about 1.4 electron volts at the operating temperature.

* * * * *

UNITED STATES PATENT AND TRADEMARK OFFICE
CERTIFICATE OF CORRECTION

PATENT NO.   : 6,072,116
DATED        : June 6, 2000
INVENTOR(S)  : Henry W. Brandhorst, Jr. et al.

It is certified that error appears in the above-identified patent and that said Letters Patent is hereby corrected as shown below:

Column 1,
Line 5, please insert -- This invention was made with Government support under grant DE-AC03-98SF21557 awarded by the Department of Energy. The Government has certain rights in this invention. --

Signed and Sealed this

Fifteenth Day of October, 2002

Attest:

JAMES E. ROGAN
Attesting Officer         Director of the United States Patent and Trademark Office